US005456567A

United States Patent [19]

Luebke

[11] Patent Number: 5,456,567

[45] Date of Patent: Oct. 10, 1995

[54] FLOOR-RUNNING STACKER CRANE AND METHOD FOR CARRYING HOT METAL

[75] Inventor: Roger D. Luebke, Hartford, Wis.

[73] Assignee: Harnischfeger Corporation, Brookfield, Wis.

[21] Appl. No.: 164,060

[22] Filed: Dec. 8, 1993

[51] Int. Cl.[6] .......... B65G 65/23

[52] U.S. Cl. .......... 414/621; 414/663; 414/786; 187/240; 212/250; 266/276

[58] Field of Search .......... 414/283, 422, 414/621, 633, 641, 642, 786, 663, 664, 672; 187/240, 234; 266/247, 276, 143; 212/250

[56] References Cited

U.S. PATENT DOCUMENTS

| | | | |
|---|---|---|---|
| 3,750,804 | 8/1973 | Lemelson | 414/283 X |
| 4,049,249 | 9/1977 | Moser et al. | 266/247 |
| 4,215,854 | 8/1980 | Lustenberger | 266/276 X |
| 4,817,919 | 4/1989 | Mutschlechner et al. | 266/276 X |
| 4,967,130 | 10/1990 | Sorensen et al. | 318/652 |
| 5,015,140 | 5/1991 | Kling | 414/663 X |

FOREIGN PATENT DOCUMENTS

| | | | |
|---|---|---|---|
| 1386538 | 4/1988 | U.S.S.R. | 414/621 |
| 92/04713 | 3/1992 | WIPO | 414/283 |

*Primary Examiner*—Michael S. Huppert
*Assistant Examiner*—Stephen Gordon
*Attorney, Agent, or Firm*—Michael, Best & Friedrich

[57] ABSTRACT

A floor-running stacker crane comprising a non-linear floor rail, a non-linear overhead rail, a base supported for movement along the floor rail, a turntable, a rotate bearing supporting the turntable on the base for rotation of the turntable relative to the base about a generally vertical axis, a rotate drive for rotating the turntable relative to the base, a mast having a lower end fixed to the turntable such that the mast rotates with the turntable relative to the base, the mast also having an upper end supported for movement along the overhead rail, a carriage moveable vertically relative to the mast, a hoist assembly for moving the carriage vertically relative to the mast, a load engaging mechanism, a rotate bearing supporting the load engaging mechanism on the carriage for rotation relative to the carriage about a generally horizontal axis, and a tilt drive for rotating the load engaging mechanism relative to the carriage.

16 Claims, 3 Drawing Sheets

FLOOR-RUNNING STACKER CRANE AND METHOD FOR CARRYING HOT METAL

BACKGROUND OF THE INVENTION

The invention relates to apparatus used in foundries or the like for conveying containers of hot metal. More particularly, the invention relates to apparatus for handling converter vessels used in the pure magnesium converter process for producing high-quality nodular iron castings. The invention also relates to stacker cranes.

In the pure magnesium converter process for producing nodular iron castings, molten metal is conveyed in a converter vessel, and magnesium is added to the molten metal in the vessel. The vessel has its own hydraulic system for opening and closing doors on the vessel. The addition of the magnesium creates a violent reaction that spews contaminants into the air. EPA restrictions on foundries require that the converter vessel be moved into a "clean room" before this violent reaction takes place.

It is known to convey this type of converter vessel within an underhung hot metal carrier. The underhung carrier runs on an overhead monorail track and has a depending mast. A carriage moves vertically relative to the mast, and forks for gripping the converter vessel are pivotable relative to the carriage about a horizontal axis. Thus, the converter vessel can be lifted and tilted. The mast does not rotate relative to the monorail track.

SUMMARY OF THE INVENTION

The invention provides a floor running stacker crane for conveying the above-described converter vessel. The stacker crane runs on a floor rail, which provides a very substantial base for the crane. The upper end of the crane is guided by an upper track that is a conventional wide-flange track with light side loading only. As a result, roof loading is negligible, and monorail track and switches with high load capacity are not required. The crane has a base that runs on the floor rail, and a mast extends upwardly from the base and is rotatable relative to the base. The base has pivoting wheels so that the floor rail can follow a curved path. A carrier moves vertically relative to the mast, and a fork mechanism (for gripping the converter vessel) pivots relative to the carrier about a horizontal axis. Thus, the converter vessel can be raised, rotated about a horizontal axis, and rotated about a vertical axis. This enables the stacker crane to move the converter vessel through extremely narrow passages. Preferably, all drives are hydraulically powered except for the base wheels. A single source of hydraulic power can be used for both the stacker crane drives and the converter vessel hydraulics. Load position is maintained by counterbalance valves and brakes. The load is immediately "frozen" in position if either hydraulic pressure or electrical power is lost.

Other features of the invention will become apparent to those skilled in the art upon review of the following detailed description, claims and drawings.

Figure 1:
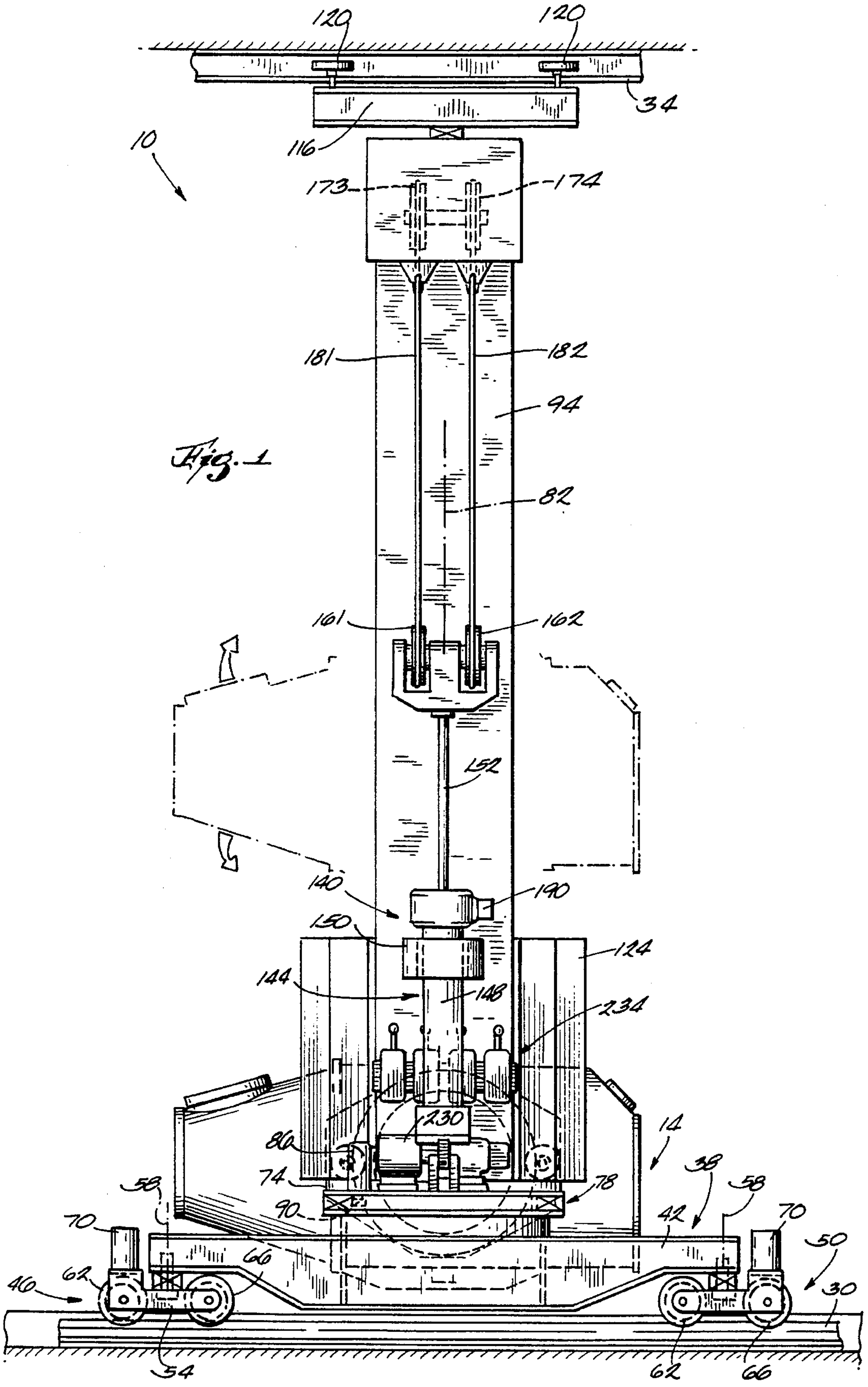
FIG. 1 is an elevational view of a stacker crane embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 4:
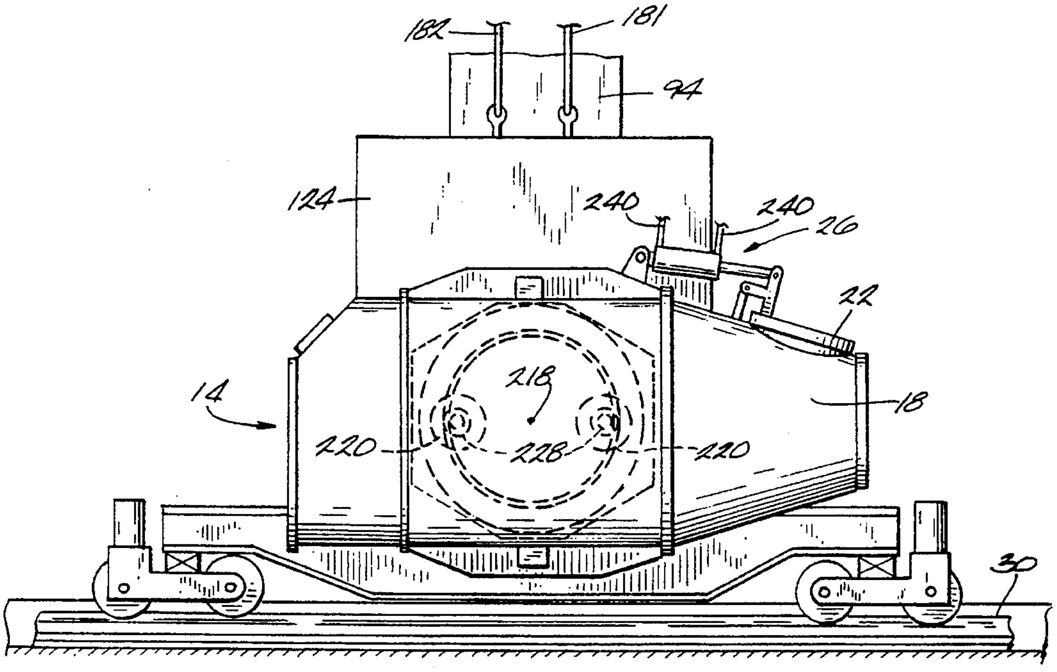
FIG. 4 is a view taken along line 4—4 in FIG. 2.

A stacker crane 10 embodying the invention is illustrated in the drawings. The crane 10 is particularly for handling a conventional converter vessel 14 used in the previously described pure magnesium converter process. The converter vessel 14 includes (see FIG. 4) a main body 18, a door 22 pivotally mounted on the main body, and a hydraulic mechanism 26 for opening and closing the door 22.

The stacker crane 10 comprises (see FIGS. 1 and 2) a floor rail 30 which is non-linear in plan view. In other words, the floor rail 30 does not follow a straight path. The crane 10 also comprises an overhead rail 34 which is located above and which follows the same path as the floor rail 30. The overhead rail 34 is preferably a conventional wide-flange I-beam, as shown in FIG. 2.

Figure 2:
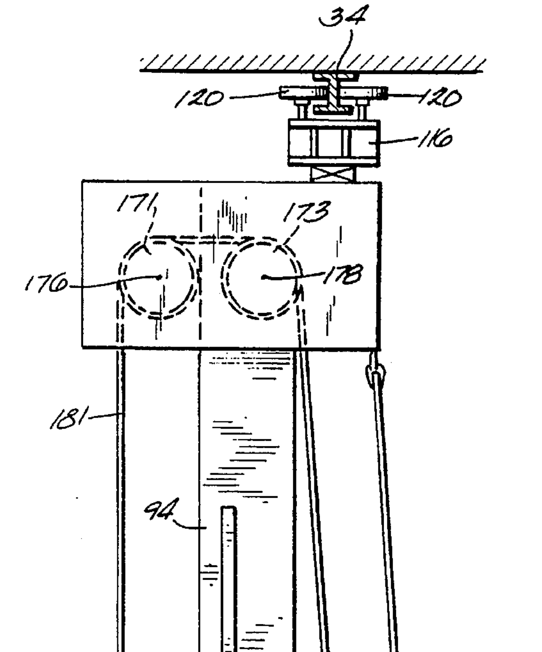
FIG. 2 is an elevational view of the left side of the crane as shown in FIG. 1.
Figure 2:
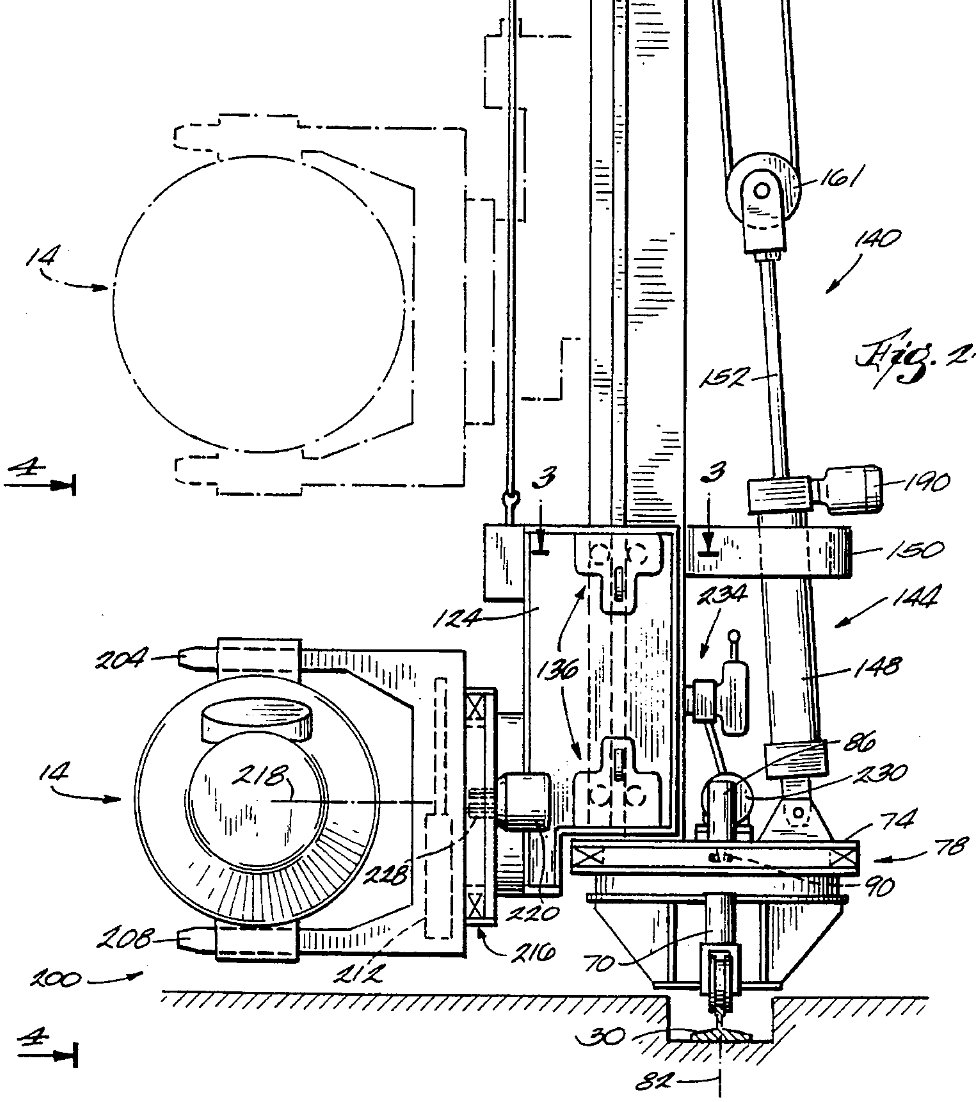

The crane 10 also comprises a base 38 including an elongated frame 42 having front and rear or left and right (as shown in FIG. 1) ends. The front and rear ends of the frame 42 are respectively supported for movement along the floor rail 30 by front and rear wheel assemblies 46 and 50. The front wheel assembly 46 includes a support 54 located beneath the front end of the frame 42 and connected to the frame 42 for pivotal movement relative thereto about a generally vertical axis 58. Any suitable bearing arrangement can be employed. The front wheel assembly 46 also includes front and rear wheels 62 and 66 rotatably mounted on the support 54 for rotation relative thereto about respective horizontal axes. The wheels roll along the floor rail 30. The front wheel assembly 46 also includes a traverse drive which is a conventional motoreducer 70 mounted on the support 54 and drivingly connected to the front wheel 62. The rear wheel assembly 50 is substantially identical to the front wheel assembly 46, and common elements have been given the same reference numeral. The rear wheel assembly 50 differs from the front wheel assembly 46 only in that the motoreducer 70 is drivingly connected to the rear wheel instead of the front wheel.

The crane 10 also comprises a circular turntable 74, and a conventional rotate bearing 78 supporting the turntable 74 on top of the bass 38 for rotation of the turntable 74 relative to the base 38 about a generally vertical axis 82. As is known in the art, the rotate bearing 78 has inner and outer races (not shown) with bearings therebetween. One of the races is fixed to the base 38, and the other of the races is fixed to the underside of the turntable 74. A hydraulic rotate drive 86 mounted on top of the turntable 74 rotates the turntable 74 relative to the base 38. The rotate drive 86 is preferably a hydraulic motoreducer with a reducer-mounted fail-safe brake. The motoreducer drives a pinion 90 which engages teeth on the bearing race fixed to the base 38 such that actuation of the rotate drive 86 rotates the turntable 74 relative to the base 38.

Figure 3:
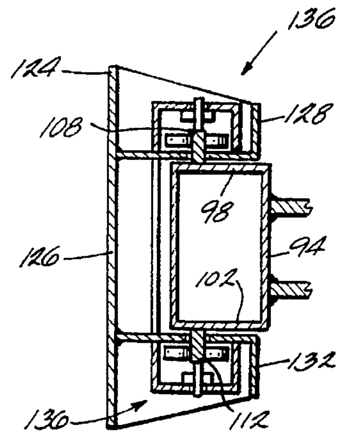
FIG. 3 is a view taken along line 3—3 in FIG. 2.

The crane 10 further comprises a mast 94 having a lower end fixed to the turntable 74 such that the mast 94 rotates with the turntable 74 relative to the base 38. As shown in FIG. 3, the mast 94 preferably has a box-like construction and has opposite side walls 98 and 102 having thereon respective vertically extending rails 108 and 112. A horizontally extending swivel beam 116 (see FIGS. 1 and 2) is mounted on the upper end of the mast 94 for pivotal movement relative thereto about the axis 82. The swivel beam 116 has front and rear or left and right (as seen in FIG. 1) ends. Each end of the swivel beam 116 has thereon a pair of rollers 120 engaging the opposite sides of the overhead rail 34 so as to guide the upper end of the mast 94.

The crane 10 also comprises a carriage 124 moveable vertically relative to the mast 94. As shown in FIG. 3, the carriage 124 is generally U-shaped when viewed from above and includes a front or main portion 126 located in front of the mast 94, and spaced side portions 128 and 132 extending outside of the mast side walls 98 and 102, respectively. Each of the side portions 128 and 132 has upper and lower roller assemblies 136. The roller assemblies 136 on the side portion 128 engage the rail 108, and the roller assemblies 136 on the side portion 132 engage the rail 112. The roller assemblies 136 restrict the carriage 124 to vertical movement along the mast 94.

Figure 5:
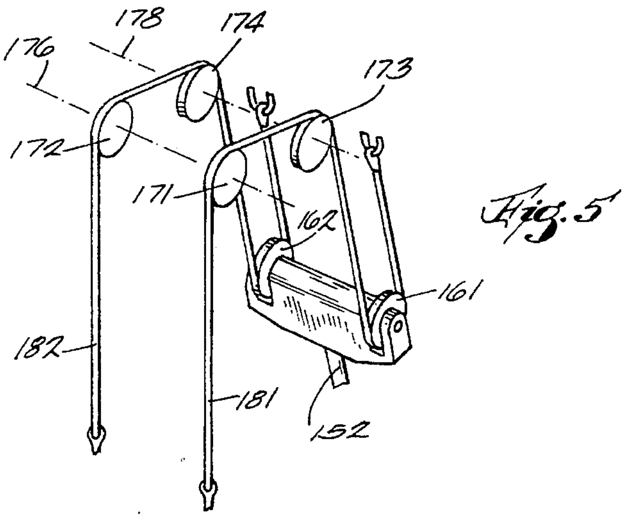
FIG. 5 is a schematic view of the reeving of the hoist apparatus.

The crane 10 further comprises a hoist assembly 140 for moving the carriage 124 vertically relative to the mast 94. The hoist assembly 140 preferably includes a hydraulic piston and cylinder assembly 144. The hydraulic assembly 144 includes a cylinder 148 having its lower end pivotally connected to the top of the turntable 74. A safety strap 150 is secured to the mast 94, surrounds the cylinder 148, and prevents the cylinder 148 from falling away from the mast in the unlikely event the hoist assembly should break. The hydraulic assembly 144 also includes a piston rod 152 extending from the upper end of the cylinder 148. Sheaves 161 and 162 are mounted on the upper end of the piston rod 152 for pivotal movement relative thereto about a horizontal axis. The hoist assembly 140 also includes sheaves 171, 172, 173 and 174. The sheaves 171 and 172 are mounted on the mast adjacent the upper end thereof for rotation relative to the mast about a horizontal axis 176, and the sheaves 173 and 174 are mounted on the mast adjacent the upper end thereof for rotation relative thereto about a horizontal axis 178 spaced from the axis 176. The hoist assembly 140 also includes hoist ropes 181 and 182. The rope 181 has an end fixed to the top of the carriage and an opposite end fixed to the mast adjacent the top of the mast. The rope 181 is reeved around the sheaves 161, 171 and 173, as shown schematically in FIG. 5. The rope 182 is reeved around the sheaves 162, 172 and 174. When the piston rod moves downwardly, i.e. when the hydraulic assembly 144 is contracted, the carriage moves upwardly a distance twice the distance the sheaves 161 and 162 move downwardly. A rod brake (not shown) is mounted on the cylinder 148. A pressure transducer 190 is also mounted on the cylinder. The pressure transducer is used to weigh the live load in the converter vessel 14. The weight is displayed on a scoreboard.

The crane 10 also comprises (see FIG. 2) a fork mechanism 200 for gripping the converter vessel 14. Such a mechanism is conventional and will be described only to the extent necessary to understand the present invention. The fork mechanism 200 includes upper and lower forks 204 and 208 moveable relative to each other by a hydraulic assembly 212 shown schematically in FIG. 2. A conventional rotate bearing 216 supports the fork mechanism 200 on the main portion of the carriage 124 for rotation relative to the carriage about a horizontal axis 218. The rotate bearing 216 is similar to the rotate bearing 78 and will not be described in detail. A hydraulic tilt drive 220 rotates the fork mechanism 200 relative to the carriage. The tilt drive 220 includes hydraulic motoreducers mounted on opposite sides of the carriage main portion 126. Each motoreducer has a pinion 228 engaging teeth on the bearing race (not shown) fixed to the fork mechanism 200, such that actuation of the motoreducers rotates the fork mechanism 200 about the axis 218.

The crane further comprises (see FIGS. 1 and 2) a hydraulic pump 230 mounted on top of the turntable 74, and a valve mechanism 234 for selectively connecting the pump 230 to the hydraulic assembly 144, the rotate drive 86, the tilt drive 220, the fork hydraulic assembly 212 and the converter hydraulic assembly 26. The valve mechanism 234 includes, for each of the foregoing, a conventional directional control valve. Load position is held in place by a counterbalance valves (not shown) and fail-safe brakes. Conventional hydraulic lines connect the pump 230 to the valve mechanism 234 and connect the valve mechanism 234 to the various hydraulic drives. The hydraulic lines connected to the converter hydraulic assembly 26 are partially shown in FIG. 4 and are identified by reference numeral 240.

The traverse drives 70 are controlled by a conventional variable frequency traverse control (not shown). The traverse control, along with all hydraulic motion amplifier cards, is preferably mounted in a single air-conditioned enclosure (not shown). When the hydraulic drives are static, the pump circulates hydraulic fluid through a cooler (not shown).

It is apparent from the foregoing that actuation of the hydraulic assembly 144 raises and lowers the converter vessel 14, actuation of the rotate drive 86 rotates the converter vessel 14 about the axis, and actuation of the tilt drive 220 rotates or tilts the vessel 14 about the axis 218. Actuation of the traverse drives 70 moves the vessel 14 along the rails. During the pure magnesium converter process, the valve mechanism 234 is operated to open the door 22, a charge of magnesium is placed in the vessel 14, the valve mechanism 234 is operated to close the door 22, and the crane 10 then conveys the vessel 14 into a clean room.

Various features of the invention are set forth in the following claims.

I claim:

1. A floor-running stacker crane comprising a floor rail, an overhead rail, a base supported for movement along said floor rail, a turntable, a rotate bearing supporting said turntable on said base for rotation of said turntable relative to said base about a generally vertical rotate axis, a rotate drive for rotating said turntable relative to said base, a mast having a lower end fixed to said turntable such that said mast rotates with said turntable relative to said base, said mast also having an upper end supported for movement along said overhead rail such that said mast extends generally from said floor rail to said overhead rail, a carriage supported by and moveable vertically relative to said mast, a hoist assembly supported by said base for moving said carriage vertically relative to said mast, a load engaging mechanism, a rotate bearing supporting said load engaging mechanism on said carriage for rotation relative to said carriage about a generally horizontal rotate axis, and a tilt drive for rotating said load engaging mechanism relative to said carriage.

2. A floor-running stacker crane comprising a floor rail, an overhead rail, a base supported for movement along said floor rail, a turntable, a rotate bearing supporting said turntable on said base for rotation of said turntable relative to said base about a generally vertical rotate axis, a rotate drive for rotating said turntable relative to said base, a mast having a lower end fixed to said turntable such that said mast rotates with said turntable relative to said base, said mast also having an upper end supported for movement along said overhead rail, a carriage supported by and moveable vertically relative to said mast, a hoist assembly supported by said base for moving said carriage vertically relative to said mast, a load engaging mechanism, a rotate bearing supporting said load engaging mechanism on said carriage for rotation relative to said carriage about a generally horizontal rotate axis, and a tilt drive for rotating said load engaging mechanism relative to said carriage, wherein said hoist assembly includes a hydraulic piston and cylinder assembly having opposite ends, one of said hydraulic assembly ends being connected to said turntable, a sheave mounted on said mast adjacent said upper end of said mast for rotation relative to said mast, and a hoist rope reeved around said sheave and extending between said carriage and the other of said hydraulic assembly ends.

3. A stacker crane as set forth in claim 2 wherein said hoist assembly includes a second sheave rotatably mounted on said other hydraulic assembly end, and wherein said rope has a first end fixed to said carriage, has a second end fixed to said mast adjacent said upper end thereof, and extends from said first end upwardly around said first-mentioned sheave, downwardly around said second sheave, and upwardly to said second end, such that downward movement of said other hydraulic assembly end a first distance causes upward movement of said carriage a second distance equalling twice said first distance.

4. A floor-running stacker crane comprising a floor rail, an overhead rail, a base supported for movement along said floor rail, a turntable, a rotate bearing supporting said turntable on said base for rotation of said turntable relative to said base about a generally vertical rotate axis, a rotate drive for rotating said turntable relative to said base, a mast having a lower end fixed to said turntable such that said mast rotates with said turntable relative to said base, said mast also having an upper end supported for movement along said overhead rail, a carriage supported by and moveable vertically relative to said mast, a hoist assembly supported by said base for moving said carriage vertically relative to said mast, a load engaging mechanisms, a rotate bearing supporting said load engaging mechanism on said carriage for rotation relative to said carriage about a generally horizontal rotate axis, and a tilt drive for rotating said load engaging mechanism relative to said carriage, wherein said floor rail is non-linear in plan view, and wherein said base includes a frame and front and rear wheel assemblies supporting said frame for movement along said floor rail, said base having front and rear ends, said front wheel assembly including a front support connected to said frame for pivotal movement relative thereto about a generally vertical front wheel axis, and front and rear wheels which are rotatably mounted on said front support and which roll along said floor rail, and said rear wheel assembly including a rear support connected to said frame for pivotal movement relative thereto about a generally vertical rear wheel axis, and front and rear wheels which are rotatably mounted on said rear support and which roll along said floor rail.

5. A stacker crane as set forth in claim 4 wherein said front wheel assembly also includes a front traverse motor drivingly connected to one of said wheels of said front wheel assembly, and wherein said rear wheel assembly also includes a rear traverse motor drivingly connected to one of said wheels of said rear wheel assembly.

6. A stacker crane as set forth in claim 4 and further comprising a swivel beam mounted on said upper end of said mast for pivotal movement relative thereto about said vertical rotate axis, said swivel beam having thereon rollers engaging said overhead rail to guide said upper end of said mast.

7. A stacker crane as set forth in claim 1 wherein said load engaging mechanism is a fork mechanism for gripping a converter vessel containing hot metal.

8. A stacker crane as set forth in claim 1 wherein said rotate drive is hydraulic, wherein said tilt drive is hydraulic, and wherein said hoist assembly is hydraulic.

9. A floor-running stacker crane comprising a floor rail, an overhead rail, a base supported for movement along said floor rail, a turntable, a rotate bearing supporting said turntable on said base for rotation of said turntable relative to said base about a generally vertical rotate axis, a hydraulic rotate drive for rotating said turntable relative to said base, a mast having a lower end fixed to said turntable such that said mast rotates with said turntable relative to said base, said mast also having an upper end supported for movement along said overhead rail, a carriage supported by and moveable vertically relative to said mast, a hydraulic hoist assembly supported by said base for moving said carriage vertically relative to said mast, a load engaging mechanism, a rotate bearing supporting said load engaging mechanism on said carriage for rotation relative to said carriage about a generally horizontal rotate axis, a hydraulic tilt drive for rotating said load engaging mechanism relative to said carriage, a hydraulic pump mounted on said turntable, and a valve mechanism for selectively connecting said hydraulic pump to said hydraulic hoist assembly, said rotate drive and said tilt drive.

10. A stacker crane as set forth in claim 9 and further comprising a converter vessel engaged by said load engaging mechanism, said vessel having a door and a hydraulic mechanism for opening and closing said door, and wherein said valve mechanism also selectively connects said pump to said hydraulic mechanism.

11. A floor-running stacker crane comprising a floor rail which is non-linear in plan view, an overhead rail which is non-linear in plan view, a base including a frame and front and rear wheel assemblies supporting said frame for movement along said floor rail, said base having front and rear ends, said front wheel assembly including a front support connected to said frame for pivotal movement relative thereto about a generally vertical front wheel axis, front and rear wheels which are rotatably mounted on said front support and which roll along said floor rail, and a front traverse motor drivingly connected to one of said wheels of said front wheel assembly, and said rear wheel assembly including a rear support connected to said frame for pivotal movement relative thereto about a generally vertical rear wheel axis, front and rear wheels which are rotatably mounted on said rear support and which roll along said floor rail, and a rear traverse motor drivingly connected to one of said wheels of said rear wheel assembly, a turntable, a rotate bearing supporting said turntable on said base for rotation of said turntable relative to said base about a generally vertical rotate axis, a hydraulic rotate drive for rotating said turntable relative to said base, a mast having a lower end fixed to said turntable such that said mast rotates with said turntable relative to said base, said mast also having an upper end, a swivel beam mounted on said upper end of said mast for pivotal movement relative thereto about said vertical rotate axis, said swivel beam having thereon rollers engaging said overhead rail to guide said upper end of said mast, a carriage moveable vertically relative to said mast, a hoist assembly for moving said carriage vertically relative to said mast, said hoist assembly including a hydraulic piston and cylinder assembly having opposite ends, one of said hydraulic assembly ends being connected to said turntable, a sheave mounted on said mast adjacent said upper end of said mast for rotation relative to said mast, and a hoist rope reeved around said sheave and extending between said carriage and the other of said hydraulic assembly ends, a fork mechanism for gripping a converter vessel, a rotate bearing supporting said fork mechanism on said carriage for rotation relative to said carriage about a generally horizontal rotate axis, a hydraulic tilt drive for rotating said fork mechanism relative to said carriage, a hydraulic pump mounted on said turntable, and a valve mechanism for selectively connecting said hydraulic pump to said hydraulic cylinder and piston assembly, said rotate drive and said tilt drive.

12. A stacker crane as set forth in claim 11 wherein said hoist assembly includes a second sheave rotatably mounted on said other hydraulic assembly end, and wherein said rope has a first end fixed to said carriage, has a second end fixed to said mast adjacent said upper end thereof, and extends from said first end upwardly around said first-mentioned sheave, downwardly around said second sheave, and upwardly to said second end, such that downward movement of said other hydraulic assembly end a first distance causes upward movement of said carriage a second distance equalling twice said first distance.

13. A stacker crane as set forth in claim 11 and further comprising a converter vessel engaged by said fork mechanism, said vessel having a door and a hydraulic mechanism for opening and closing said door, and wherein said valve mechanism also selectively connects said pump to said hydraulic mechanism.

14. A method for handling a converter vessel for containing hot metal, said vessel having a door and a hydraulic mechanism for opening and closing said door, said method comprising the steps of providing a stacker crane including a floor rail, an overhead rail, a base supported for movement along said floor rail, a turntable, a rotate bearing supporting said turntable on said base for rotation of said turntable relative to said base about a generally vertical rotate axis, a hydraulic rotate drive for rotating said turntable relative to said base, a mast having a lower end fixed to said turntable such that said mast rotates with said turntable relative to said base, said mast also having an upper end supported for movement along said overhead rail, a carriage moveable vertically relative to said mast, a hydraulic hoist assembly for moving said carriage vertically relative to said mast, a mechanism for engaging said converter vessel, a rotate bearing supporting said engaging mechanism on said carriage for rotation relative to said carriage about a generally horizontal rotate axis, a hydraulic tilt drive for rotating said engaging mechanism relative to said carriage, a hydraulic pump mounted on said turntable, and a valve mechanism for selectively connecting said hydraulic pump to said hydraulic hoist assembly, said rotate drive, and said tilt drive, engaging said converter vessel with said engaging mechanism of said crane, connecting said valve mechanism to said converter vessel hydraulic mechanism so that said valve mechanism selectively connects said pump to said converter vessel hydraulic mechanism, operating said valve mechanism to cause said converter vessel hydraulic mechanism to open said door, placing a charge in said converter vessel, operating said valve mechanism to cause said converter vessel hydraulic mechanism to close said door, and moving said crane along said floor rail to move said converter vessel into a clean room.

15. A floor-running stacker crane comprising a floor rail, an overhead rail, a base supported for movement along said floor rail, a turntable, a rotate bearing supporting said turntable on said base for rotation of said turntable relative to said base about a generally vertical rotate axis, a rotate drive for rotating said turntable relative to said base, a mast having a lower end fixed to said turntable such that said mast rotates with said turntable relative to said base, said mast also having an upper end supported for movement along said overhead rail such that said mast extends generally from said floor rail to said overhead rail, a carriage supported by and moveable vertically relative to said mast, a hoist assembly supported by said base for moving said carriage vertically relative to said mast, said hoist assembly including a drive mechanism supported by said base, a sheave mounted on said mast adjacent said upper end of said mast for rotation relative to said mast, and a hoist rope reeved around said sheave and extending between said carriage and said drive mechanism, a load engaging mechanism, a rotate bearing supporting said load engaging mechanism on said carriage for rotation relative to said carriage about a generally horizontal rotate axis, and a tilt drive for rotating said load engaging mechanism relative to said carriage.

16. A floor-running stacker crane as set forth in claim 15 wherein said drive mechanism includes a hydraulic piston and cylinder assembly having opposite ends, one of said hydraulic assembly ends being connected to said turntable, and wherein said hoist rope extends between said carriage and the other of said hydraulic assembly ends.

* * * * *